United States Patent
Tripuraneni et al.

(10) Patent No.: US 12,019,675 B2
(45) Date of Patent: Jun. 25, 2024

(54) RECOGNIZING TEXT IN IMAGE DATA

(71) Applicant: Capital One Services, LLC, McLean, VA (US)

(72) Inventors: Subhashini Tripuraneni, Glen Allen, VA (US); Joseph R. Barco, Jr., Midlothian, VA (US)

(73) Assignee: Capital One Services, LLC, McLean, VA (US)

( * ) Notice: Subject to any disclaimer, the term of this patent is extended or adjusted under 35 U.S.C. 154(b) by 118 days.

(21) Appl. No.: 17/249,571

(22) Filed: Mar. 5, 2021

(65) Prior Publication Data

US 2021/0192202 A1 Jun. 24, 2021

Related U.S. Application Data

(63) Continuation of application No. 16/139,737, filed on Sep. 24, 2018, now Pat. No. 10,943,106, which is a (Continued)

(51) Int. Cl.
*G06F 16/583* (2019.01)
*G06F 16/93* (2019.01)
(Continued)

(52) U.S. Cl.
CPC .......... *G06F 16/5846* (2019.01); *G06F 16/93* (2019.01); *G06V 10/44* (2022.01);
(Continued)

(58) Field of Classification Search
CPC .... G06V 30/414; G06V 10/255; G06V 10/44; G06V 10/98; G06V 30/224;
(Continued)

(56) References Cited

U.S. PATENT DOCUMENTS

| 5,140,650 A | 8/1992 | Casey et al. |
| 6,886,136 B1 | 4/2005 | Zlotnick et al. |

(Continued)

FOREIGN PATENT DOCUMENTS

| CN | 104732226 A | 6/2015 |
| WO | 2005122062 A1 | 12/2005 |
| WO | 2008127443 A1 | 10/2008 |

OTHER PUBLICATIONS

G. Nagy and Prateek Sarkar, "Document style census for OCR," First International Workshop on Document Image Analysis for Libraries, 2004. Proceedings., 2004, pp. 134-147, doi: 10.1109/DIAL.2004.1263245. (Year: 2004).*

(Continued)

*Primary Examiner* — Andrae S Allison
(74) *Attorney, Agent, or Firm* — Harrity & Harrity, LLP

(57) ABSTRACT

A device may receive image data representing a document, the document including: text, and edges. Based on the edges, the device may identify, a segment of interest within the image data and crop the segment of interest to obtain a portion of the image data. In addition, the device may perform optical character recognition on the portion of the image data, the optical character recognition producing recognized text. The device may obtain, based on the recognized text, validation data that includes verification text, and determine whether the recognized text is verified based on the verification text. Based on a result of the determination, the device may perform an action.

20 Claims, 4 Drawing Sheets

Related U.S. Application Data continuation of application No. 15/845,623, filed on Dec. 18, 2017, now Pat. No. 10,095,925.

(51) Int. Cl.
| | |
|---|---|
| *G06V 10/44* | (2022.01) |
| *G06V 30/10* | (2022.01) |
| *G06V 30/12* | (2022.01) |
| *G06V 30/146* | (2022.01) |
| *G06V 30/224* | (2022.01) |
| *G06V 30/413* | (2022.01) |
| *G06V 30/414* | (2022.01) |
| *G06V 30/416* | (2022.01) |

(52) U.S. Cl.
CPC .......... *G06V 30/12* (2022.01); *G06V 30/1473* (2022.01); *G06V 30/224* (2022.01); *G06V 30/413* (2022.01); *G06V 30/414* (2022.01); *G06V 30/416* (2022.01); *G06V 30/10* (2022.01)

(58) Field of Classification Search
CPC .... G06V 30/413; G06V 30/416; G06V 30/10; G06V 30/12; G06V 30/1473; G06F 16/5846; G06F 16/93
See application file for complete search history.

(56) References Cited

U.S. PATENT DOCUMENTS

| | | | |
|---|---|---|---|
| 7,149,347 B1 | 12/2006 | Wnek et al. | |
| 7,421,126 B2 | 9/2008 | Deere et al. | |
| 7,627,177 B2 | 12/2009 | Tzadok et al. | |
| 7,738,700 B2 | 6/2010 | Shiiyama et al. | |
| 8,625,902 B2 | 1/2014 | Baheti et al. | |
| 8,805,117 B2 | 8/2014 | Liu et al. | |
| 8,879,783 B1* | 11/2014 | Wang | G06K 7/10 382/176 |
| 9,547,799 B2 | 1/2017 | Chen et al. | |
| 9,626,584 B2* | 4/2017 | Lin | G06T 11/60 |
| 9,721,178 B2 | 8/2017 | Ramnani et al. | |
| 9,754,187 B2 | 9/2017 | Panferov et al. | |
| 9,818,154 B1 | 11/2017 | Wilbert et al. | |
| 10,095,925 B1* | 10/2018 | Tripuraneni | G06V 30/1473 |
| 11,087,409 B1* | 8/2021 | Bobley | G06Q 10/06395 |
| 2006/0048242 A1* | 3/2006 | Kojima | C12N 15/8205 800/279 |
| 2007/0017922 A1* | 1/2007 | Arciniegas | B65D 21/0233 220/675 |
| 2007/0045398 A1 | 3/2007 | Chen | |
| 2012/0076413 A1 | 3/2012 | Ferman et al. | |
| 2012/0183211 A1 | 7/2012 | Hsu et al. | |
| 2014/0140609 A1* | 5/2014 | Krishnaswamy | G06T 7/70 382/199 |
| 2014/0267647 A1* | 9/2014 | Wexler | G06V 10/255 348/62 |
| 2015/0003666 A1* | 1/2015 | Wang | G06V 30/416 382/100 |
| 2015/0169638 A1* | 6/2015 | Jaber | G06F 16/5854 707/749 |
| 2015/0278224 A1 | 10/2015 | Jaber et al. | |
| 2015/0278593 A1* | 10/2015 | Panferov | G06K 9/6255 382/182 |
| 2015/0302027 A1 | 10/2015 | Wnuk et al. | |
| 2016/0292876 A1* | 10/2016 | Zhao | G06T 7/143 |
| 2016/0358268 A1* | 12/2016 | Verma | G06N 5/047 |
| 2017/0064035 A1* | 3/2017 | Lai | G06V 30/414 |
| 2017/0161826 A1* | 6/2017 | Packer | G06Q 40/025 |
| 2018/0157907 A1* | 6/2018 | Loginov | G06V 30/40 |
| 2018/0349939 A1 | 12/2018 | Setchell et al. | |
| 2019/0188465 A1 | 6/2019 | Tripuraneni et al. | |
| 2019/0197308 A1 | 6/2019 | Yeh et al. | |

OTHER PUBLICATIONS

Chen S., et al., "Efficient Automatic OCR Word Validation using Word Partial Format Derivation and Language Model," Proc. SPIE 7534, Document Recognition and Retrieval XVII, 753400, Jan. 18, 2010, 9 pages.

Tumane V., et al., "A Novel Approach for Image Cropping and Automatic Contact Extraction from Images," VJER—Vishwakarma Journal of Engineering Research, Dec. 4, 2017, 8 pages.

* cited by examiner

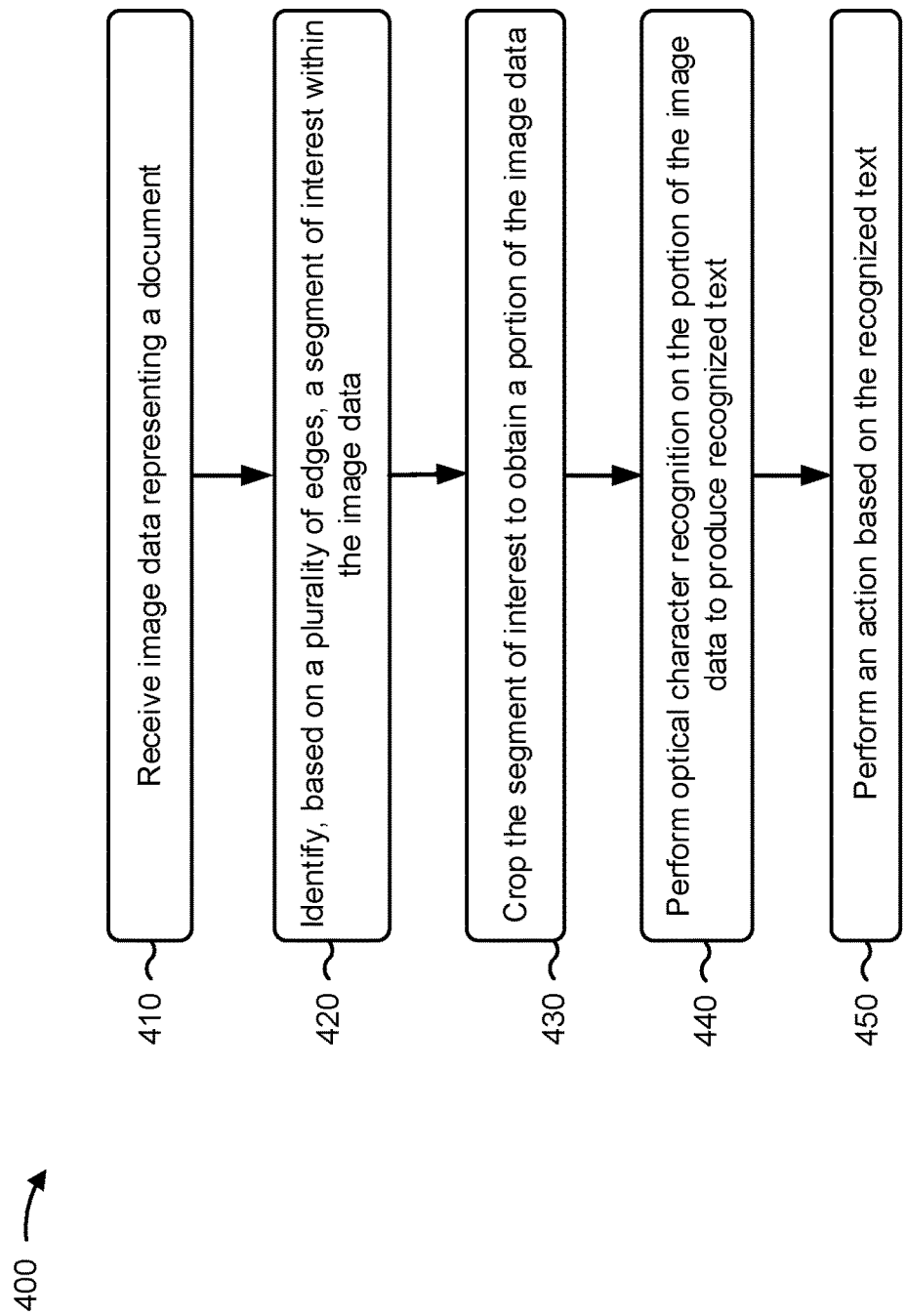

RECOGNIZING TEXT IN IMAGE DATA

RELATED APPLICATION

This application is a continuation of U.S. patent application Ser. No. 16/139,737, filed Sep. 24, 2018 (now U.S. Pat. No. 10,943,106), which is a continuation of U.S. patent application Ser. No. 15/845,623, filed Dec. 18, 2017 (now U.S. Pat. No. 10,095,925), the contents of which are incorporated herein by reference in their entireties.

BACKGROUND

Optical character recognition techniques are often used in computing environments to identify text within an image and extract the text in a manner designed to enable the identified text to be read by a human and/or handled by a computer. For example, digital documents may often be stored on a computer as an image, rather than machine-encoded text. Optical character recognition can identify text included in digital documents so that they can be electronically processed.

SUMMARY

According to some implementations, a device, may comprise: one or more memory devices; and one or more processors, communicatively connected to the one or more memory devices, to: receive image data representing a document, the document including: text, and a plurality of edges; identify, based on the plurality of edges, a segment of interest within the image data; crop the segment of interest to obtain a portion of the image data; perform optical character recognition on the portion of the image data, the optical character recognition producing recognized text; obtain, based on the recognized text, validation data, the validation data including verification text; determine whether the recognized text is verified based on the verification text; and perform an action based on a result of the determination.

According to some implementations, a non-transitory computer-readable medium may store instructions, the instructions comprising: one or more instructions that, when executed by one or more processors, cause the one or more processors to: receive image data representing a document, the document including: text, and a plurality of edges; identify, based on the plurality of edges, a plurality of segments within the image data; identify, from the plurality of segments, a segment of interest based on a location of the segment of interest within the image data; crop the segment of interest to obtain a portion of the image data; perform optical character recognition on the portion of the image data, the optical character recognition producing recognized text; and perform an action based on the recognized text.

According to some implementations, a method may comprise: receiving, by a device, image data representing a document, the document including: text, and a plurality of edges; receiving, by the device, data identifying text of interest associated with the image data; identifying, by the device and based on the plurality of edges, a plurality of segments within the image data; identifying, by the device and from the plurality of segments, a segment of interest, the segment of interest including the text of interest; cropping, by the device, the segment of interest to obtain a portion of the image data; performing, by the device, optical character recognition on the portion of the image data, the optical character recognition producing recognized text, the recognized text including the text of interest; and performing, by the device, an action based on the recognized text.

BRIEF DESCRIPTION OF THE DRAWINGS

FIG. 4 is a flow chart of an example process for recognizing text in image data.

DETAILED DESCRIPTION

Figure 1:
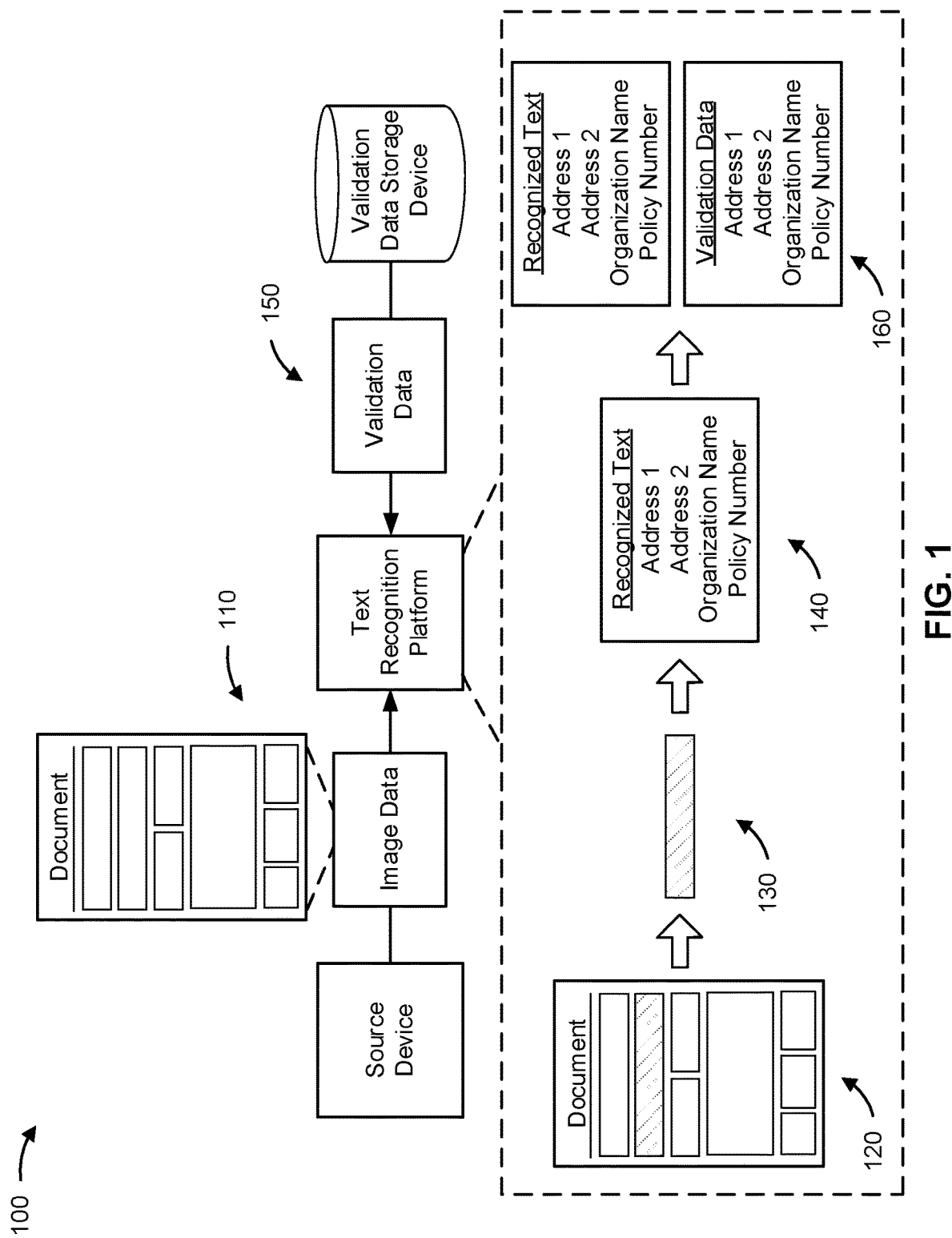
FIG. 1 is a diagram of an overview of an example implementation described herein.

The following detailed description of example implementations refers to the accompanying drawings. The same reference numbers in different drawings may identify the same or similar elements.

Optical character recognition (OCR) processes are often used to obtain machine-encoded text from an image file. While this may enable a computing device to perform a variety of operations on the text obtained from the OCR process (e.g., searching the text, editing the text, storing the text, and/or the like), OCR often produces inaccurate text. For example, in situations where the image file is blurry and/or skewed, or where the image file depicts non-standard (e.g., non-alpha-numeric) text and/or non-text objects, OCR may fail to properly identify text within the image file. In addition, in some situations, the formatting of text obtained from OCR may be inaccurate or non-existent, making the text difficult for a human to understand and/or difficult for a computer to appropriately store or otherwise process the text. Improving the results of OCR and/or correcting inaccuracies, often involves the use of significant human and computing resources, making the processes inefficient to perform, especially at scale.

Some implementations, describe herein, may provide a text recognition platform that receives image data depicting a document. Using the image data, the text recognition platform may use computer vision techniques to identify edges in the image data which may, for example, correspond to boxes and/or lines for text in forms or other types of documents. The text recognition platform may then, using the edges or other data (e.g., input data and/or other image features identified in the computer vision process), identify a segment of interest within the image data. The text recognition platform may crop the segment of interest from the image data and perform OCR on the cropped portion of the image data to produce recognized text. The cropped portion of the image data may not include the edges in the image data that correspond to boxes and/or lines identified using the computer vision techniques. In this way, OCR may be performed on the segment(s) of interest unhindered by the boxes and/or lines, which otherwise may create inaccuracies in existing OCR techniques. Based on the recognized text, the text recognition platform may perform a variety of actions. For example, the text recognition platform may obtain validation data based on a portion of the recognized text and compare portions of the validation data to portions of the recognized text, e.g., in a manner designed to verify that the recognized text is accurate. As another example, the text recognition platform may retrain the model used for OCR based on the results of the text recognition process, e.g., in a manner designed to improve the OCR model for recognizing text included in similar segments of interest in future applications of the OCR model. Other actions, in addition to or alternatively to those described above, may also be performed by the text recognition platform when performing text recognition.

In this way, the text recognition platform may provide an improved OCR process that improves the accuracy of OCR, provides additional utility for OCR processes, and reduces human and computing resources involved in processes designed to obtain text from images. The accuracy of OCR may be improved, for example, by using preprocessing techniques to improve an input image, using segmenting, OCR model updates, and/or multiple OCR models to target specific segments of an image. The text recognition platform may provide additional utility, for example, by enabling verification of recognized text using validation data and/or by enabling recognized text to be formatted in a manner appropriate for its intended use. Human and computing resources, including data storage resources, memory resources, and data processing resources, may be conserved by obviating the need to perform additional processing on image data to improve OCR results, obviating the need to perform multiple OCR operations on image data, obviating the need to manually correct, format, and/or verify recognized text. In addition, the text recognition platform may perform text recognition on a large scale, enabling relatively accurate textual recognition to be performed on hundred, thousands, millions, billions, etc. of images.

FIG. 1 is a diagram of an overview of an example implementation 100 described herein. As shown in FIG. 1, example implementation 100 may include a source device (e.g., any electronic device capable of providing image data to text recognition platform), a text recognition platform, and a validation data storage device. In some implementations, the text recognition platform may include a cloud computing platform, one or more server devices, and/or the like. The text recognition platform may be associated with an entity that provides text recognition services to users, organizations, or other entities, such as a user associated with the source device and/or an organization associated with the text recognition platform. The validation data storage device may be a digital storage device included in the text recognition platform and/or separate from the text recognition platform (in whole or in part).

As shown in FIG. 1, and by reference number 110, the text recognition platform receives image data from the source device. The image data may include any type of digital image, such as a digital image captured by a camera, scanner, and/or the like. In the example implementation, the image data depicts a document, which may include any representation of text in a variety of formats, such an image of a form, an image of a word processing document, a portable document format (PDF) image, a screen capture of a web page, and/or the like. In the example implementation 100, the image data may depict, for example, a form captured from a document scanning device.

As further shown in FIG. 1, and by reference number 120, the text recognition platform identifies segments in the image data. For example, the text recognition platform may use one or more computer vision techniques to identify edges depicted in the image data. The text recognition platform may use the identified edges to identify the segments within the image data, e.g., each segment being defined by one or more edges forming a rectangular shape. In some implementations, text recognition platform may identify, from the segments identified in the image data, a segment of interest, e.g., a segment that includes or is likely to include text of interest, such as text of a particular type. By way of example, the document depicted in the image data may be a particular insurance form, and the text of interest may be a street address. The type of text (e.g., street address) may have been previously provided to the text recognition platform (e.g., by source device, user input, and/or the like), in a manner designed to enable the text recognition platform to identify, within the image data, the segment of interest that includes the street address.

As further shown in FIG. 1, and by reference number 130, the text recognition platform may crop the segment of interest from the image data to obtain a portion of the image data. The text recognition platform may then, as shown by reference number 140, perform OCR on the portion of the image data to obtain recognized text. While the example implementation 100 depicts the performance of OCR after cropping the segment of interest, in some implementations, OCR may be performed prior to the cropping, as described in further detail, below. In some implementations, the text recognition platform may use an OCR model based on the text of interest, e.g., in a situation where the text of interest is a street address, the text recognition platform may use an OCR model that has been trained to accurately identify street addresses from image data. The recognized text, in this example, includes address information, an organization name, and a policy number.

As further shown in FIG. 1, and by reference number 150, the text recognition platform obtains validation data, e.g., from the validation data storage device. The validation data, as shown by reference number 160, includes data that may be used to verify that the recognized text obtained from the OCR process is accurate. The text recognition platform may obtain the validation data, for example, based on the previously provided text of interest and/or based on the recognized text. By way of example, to verify that recognized text, including the address and other information, is accurate, the text recognition platform may search for the recognized text (or a portion thereof) in a database or using a search engine, to obtain the validation data. By comparing the validation data to the recognized text, the text recognition platform may determine whether the recognized text is accurate. In some implementations, the text recognition platform may perform a variety of actions based on the recognized text. For example, the text recognition platform may correct inaccuracies in the text, store the text in a database, notify a third party regarding the recognized text, and/or the like.

In this way, the text recognition platform may provide an improved OCR process that improves the accuracy of OCR, provides additional utility for OCR processes, and reduces human and computing resources involved in processes designed to obtain text from images. The accuracy of OCR may be improved, for example, by using preprocessing techniques to improve an input image, using segmenting, OCR model updates, and/or multiple OCR models to target specific segments of an image. The text recognition platform may provide additional utility, for example, by enabling verification of recognized text using validation data and/or by enabling recognized text to be formatted in a manner appropriate for its intended use. Human and computing resources, including data storage resources, memory resources, and data processing resources, may be conserved by obviating the need to perform additional processing on image data to improve OCR results, obviating the need to perform multiple OCR operations on image data, obviating the need to manually correct, format, and/or verify recognized text. In addition, the text recognition platform may perform text recognition on a large scale, enabling relatively accurate textual recognition to be performed on hundreds, thousands, millions, billions, etc. of images.

As indicated above, FIG. 1 is provided merely as an example. Other examples are possible and may differ from what was described with regard to FIG. 1.

Figure 2:
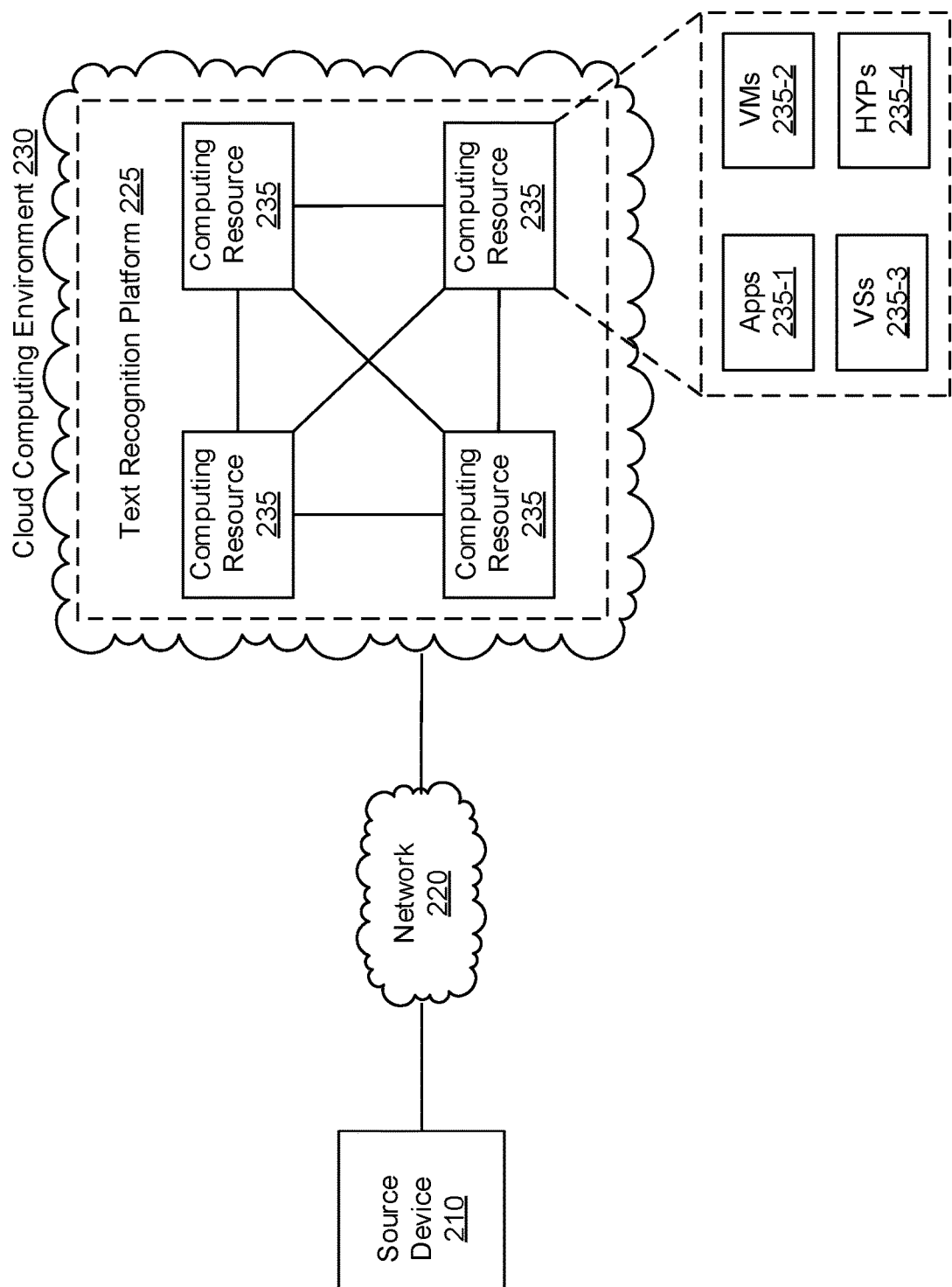
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a source device 210, a network, and/or a text recognition platform 225 hosted within a cloud computing environment 230. Devices of environment 200 may interconnect via wired connections, wireless connections, or a combination of wired and wireless connections.

Source device 210 includes one or more devices capable of receiving, generating, storing, processing, and/or providing information associated with image data. For example, source device 210 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, source device 210 may include one or more devices for capturing images, such as a digital camera, digital video camera, a scanner, and/or the like. Source device 210 may be capable of providing text recognition platform 225 with image data and/or data relevant to the image data, such as data identifying text of interest.

Network 220 includes one or more wired and/or wireless networks. For example, network 220 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Text recognition platform 225 includes one or more devices capable of receiving, generating, storing, processing, and/or providing information associated with recognizing text in image data. For example, text recognition platform 225 may include a server device (e.g., a host server, a web server, an application server, etc.), a data center device, or a similar device. Text recognition platform 225 is capable of performing computer vision techniques on image data to obtain a segment of interest, performing OCR on the segment of interest to obtain recognized text, and performing one or more other actions, such as confirming the accuracy of the recognized text using validation data, updating a data storage device using the recognized text, and/or the like. Text recognition platform 225 may, in some implementations, include or otherwise have access to other resources to facilitate performing one or more of the processes described above, including resources for generating models via machine learning, resources for storing or obtaining validation data, and/or the like.

In some implementations, as shown, text recognition platform 225 may be hosted in cloud computing environment 230. Notably, while implementations described herein describe text recognition platform 225 as being hosted in cloud computing environment 230, in some implementations, text recognition platform 225 might not be cloud-based (i.e., may be implemented outside of a cloud computing environment) or might be partially cloud-based.

Cloud computing environment 230 includes an environment that hosts text recognition platform 225. Cloud computing environment 230 may provide computation, software, data access, storage, and/or other services that do not require end-user knowledge of a physical location and configuration of a system(s) and/or device(s) that host text recognition platform 225. As shown, cloud computing environment 230 may host text recognition platform 225 and computing resource 235 (referred to collectively as "computing resources 235 and individually as "computing resource 235").

Computing resource 235 includes one or more personal computers, workstation computers, server devices, or another type of computation and/or communication device. In some implementations, computing resource 235 may host text recognition platform 225. The cloud resources may include compute instances executing in computing resource 235, storage devices provided in computing resource 235, data transfer devices provided by computing resource 235, etc. In some implementations, computing resource 235 may communicate with other computing resources 235 via wired connections, wireless connections, or a combination of wired and wireless connections.

As further shown in FIG. 2, computing resource 235 may include a group of cloud resources, such as one or more applications ("APPs") 235-1, one or more virtual machines ("VMs") 235-2, virtualized storage ("VSs") 235-3, one or more hypervisors ("HYPs") 235-4, or the like.

Application 235-1 includes one or more software applications that may be provided to or accessed by source device 210. Application 235-1 may eliminate a need to install and execute the software applications on source device 210. For example, application 235-1 may include software associated with text recognition platform 225 and/or any other software capable of being provided via cloud computing environment 230. In some implementations, one application 235-1 may send/receive information to/from one or more other applications 235-1, via virtual machine 235-2.

Virtual machine 235-2 includes a software implementation of a machine (e.g., a computer) that executes programs like a physical machine. Virtual machine 235-2 may be either a system virtual machine or a process virtual machine, depending upon use and degree of correspondence to any real machine by virtual machine 235-2. A system virtual machine may provide a complete system platform that supports execution of a complete operating system ("OS"). A process virtual machine may execute a single program, and may support a single process. In some implementations, virtual machine 235-2 may execute on behalf of a user (e.g., source device 210), and may manage infrastructure of cloud computing environment 230, such as data management, synchronization, or long-duration data transfers.

Virtualized storage 235-3 includes one or more storage systems and/or one or more devices that use virtualization techniques within the storage systems or devices of computing resource 235. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 235-4 provides hardware virtualization techniques that allow multiple operating systems (e.g., "guest operating systems") to execute concurrently on a host computer, such as computing resource 235. Hypervisor 235-4 may present a virtual operating platform to the guest operating systems, and may manage the execution of the guest operating systems. Multiple instances of a variety of operating systems may share virtualized hardware resources.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
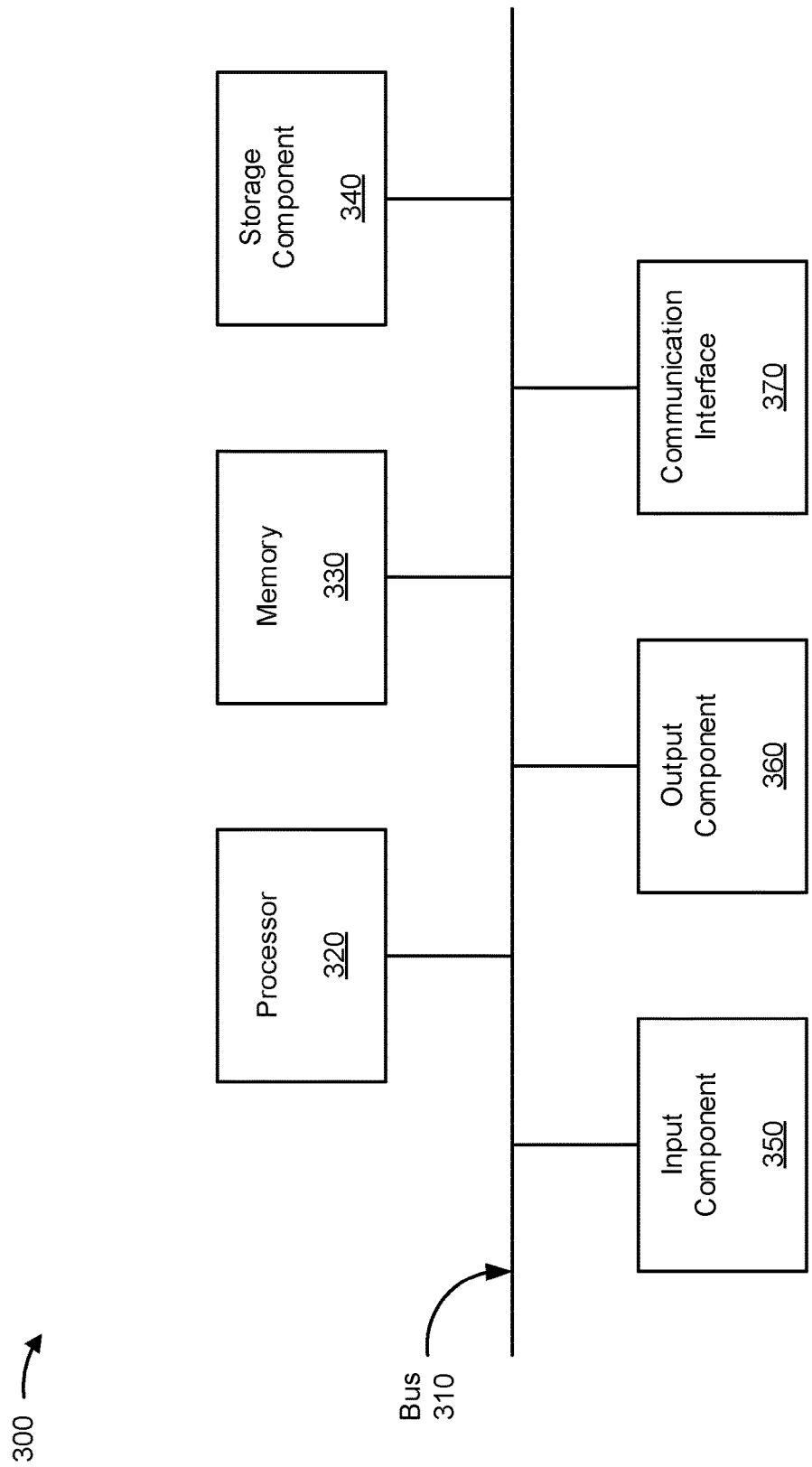
FIG. 3 is a diagram of example components of one or more devices of FIG. 2.

FIG. 3 is a diagram of example components of a device 300. Device 300 may correspond to source device 210 or text recognition platform 225. In some implementations, source device 210 or text recognition platform 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a flow chart of an example process 400 for recognizing text in image data. In some implementations, one or more process blocks of FIG. 4 may be performed by text recognition platform 225. In some implementations, one or more process blocks of FIG. 4 may be performed by another device or a group of devices separate from or including text recognition platform 225, such as source device 210.

As shown in FIG. 4, process 400 may include receiving image data representing a document (block 410). For example, text recognition platform 225 may receive image data representing a document. In some implementations, text recognition platform 225 receives the image data from source device 210, though image data may be received from another device, such as a local or remote storage device and/or a third party device. The image data may include, in some implementations, an image file, which may be in a variety of formats (e.g., Joint Photographic Experts Group (JPEG), PDF, tagged image file format (TIFF), portable network graphic (PNG), and/or the like).

The image data may represent a document in a variety of ways. For example, the image data may be, in its entirety, a representation of a document (e.g., as in a situation where a physical document was scanned, photographed, or screen captured to produce the image data). In some implementations, the image data may include a document, but may also include other objects not specifically relating to a document. In some implementations, the image data may include representations of multiple documents, such as a photograph of multiple documents and/or a multi-page image file.

In some implementations, text recognition platform 225 may receive image data in batches of one or more image files, e.g., by retrieving image data in batches from a storage device, or receiving image data in batches from source device 210. In some implementations, text recognition platform 225 may receive image data as a stream of image data, e.g., from source device 210 or many source devices 210, such as a situation where text recognition platform 225 is part of a large scale computing platform that is fed image data from multiple computing devices to enable text recognition on a large scale.

In some implementations, text recognition platform 225 may receive additional information related to the image data, e.g., information that facilitates the recognition of text within the image data. For example, text recognition platform 225 may receive data indicating text of interest that may be included in the image data, data indicating a type of document represented by the image data, data indicating one or more entities associated with the document, and/or the like. By way of example, text recognition platform 225 may receive additional information specifying, for the image data, that the image data represents an insurance form associated with an insurance company, and that the insurance form contains address information that is the text of interest (e.g., the text that text recognition platform 225 should target for text recognition). This additional image data may be obtained in a variety of ways, including from source device 210, from user input, from default configuration information, from a third party device, and/or the like.

In this way, text recognition platform 225 may receive image data representing a document, enabling text recognition platform 225 to perform a variety of actions on the image data, such as preprocessing the image data, identifying edges, segments, and segments of interest within the text data, and/or the like.

As further shown in FIG. 4, process 400 may include identifying, based on a plurality of edges, a segment of interest within the image data (block 420). For example, text recognition platform 225 may identify, based on a plurality of edges, a segment of interest within the image data. In some implementations, text recognition platform may perform one or more computer vision techniques (e.g., Canny edge detection, phase congruency-based edge detection, phase stretch transform edge detection, and/or the like) on the image data to identify edges within the image data, determine segments from the edges (e.g., rectangular segments defined by the edges), and determine which segment or segments may include text of interest. Text recognition platform 225 may perform a variety of actions designed to facilitate identification of the segment or segments of interest within the image data.

In some implementations, text recognition platform 225 may preprocess the image data in a manner designed to make the image data easier to read by computer vision and/or OCR techniques. Preprocessing may include a variety of operations that may be performed by text recognition platform 225 and/or by another device or devices in communication with text recognition platform 225. Preprocessing may include, for example, image contrast adjustments via contrast stretching or another contrast adjustment operation, image noise filtering or another noise reduction operation, image histogram modification, a skew correction operation, and/or the like. In some implementations, preprocessing may include cropping the image data, e.g., in a situation where multiple documents are depicted in the image data, text recognition platform 225 may crop the multiple documents to form multiple portions of image data that can be separately processed. Some of the operations described as being performed in a separate block of process 400 may, in some implementations, be included in the preprocessing block, such as segment identification, segment of interest identification, and/or the like.

In some implementations, the text recognition platform 225 may identify a document type associated with the document depicted in the image data. This may be performed in a variety of ways. For example, the document type may be previously provided to text recognition platform 225, e.g., from source device 210 or based on configuration information associated with the text recognition platform 225 (such as a situation where text recognition platform 225 is configured to receive and process a particular type of document). In some implementations, the image data may include one or more features that identify the document type. In this situation, text recognition platform 225 may use one or more computer vision and/or OCR techniques to identify the document type. For example, a bar code, matrix bar code (e.g., QR code), document title, or the like, may be a feature that text recognition platform 225 may use to identify the type of document represented in the image data. As another example, other text or features of the document may be used to determine the type of document, including fine print, images, graphics, layout of the document, and/or the like. In this situation, the features identified in the document represented by the image data may be provided to a classification model designed to output a document type based on the document features provided as input. In this way, text recognition platform 225 may identify the document type associated with the document depicted in the image data, which may facilitate the identification of a segment of interest within the image data.

In some implementations, text recognition platform 225 may use one or more computer vision techniques in a manner designed to identify edges present in the image data. For example, text recognition platform 225 may use edge detection techniques on the image data. Text recognition platform 225 may interpret the edges included in the image data to define distinct portions, or segments, of the document. By way of example, a particular type of form may have multiple boxes, such as a box for information regarding the entity filling out the form, a box for providing information about an organization, a box for filling out information relevant to the form, a box for the recipient of the form to fill out, a box for a signature line, and/or the like. Text recognition platform 225 may identify the boxes using computer vision techniques designed to detect shapes, including shapes defined by edges (e.g., rectangles) within the image data. In some implementations, text recognition platform 225 may introduce artificial edges for a document represented by the image data, e.g., in a situation where a document includes lines rather than boxes, text recognition platform 225 may infer a rectangle that includes one or more lines detected within the image data (e.g., enabling, for example, the edge of the document itself to be an edge that forms part of a rectangular segment, and/or a line of the document to be used as an edge of a rectangle surrounding text written above the line). In this way, text recognition platform 225 may identify edges that may be used to identify segments, facilitating the recognition of one or more segments of interest.

Text recognition platform 225 may identify the segment of interest from edges identified in the image data in a variety of ways. As noted above, the edges identified in the image data may be used to identify segments (e.g., by defining substantially rectangular segments that may include text). In some implementations, the entire image data may be analyzed to identify each of the segments in the image data. In other implementations, one or more subsets of image data may be analyzed to identify subsets of segments in the image data. In some implementations, text recognition platform may further process each of the identified segments as segments of interest. In other implementations, further processing may be performed only for particular segments of interest. For example, text recognition platform 225 may identify the segment of interest by identifying the segment that includes the text of interest. Identifying the segment that includes the text of interest may performed in a variety of ways. In some implementations, text recognition platform 225 may perform OCR on all or a portion of one or more of the segments of interest to determine whether the data included in the segment of interest matches the expected (e.g., previously obtained) text of interest. By way of example, in a situation where the text of interest is an address, text recognition platform 225 may perform OCR on one or more of the segments defined by the identified edges to find a segment that includes an address, and select that segment as the segment of interest.

In some implementations, text recognition platform 225 may identify the segment of interest based on the location of segment of interest within the document. For example, in a situation where text recognition platform 225 has previously identified the document type of the document, data associated with the document type may indicate the location, within the document, of the text of interest. By matching the location indicated by the data associated with the document type and the location of a segment of interest identified from the image data, text recognition platform 225 may determine that the segment of interest is or is likely to include the text of interest. By way of example, in a situation where text recognition platform 225 has identified the image data as representing a particular type of form, and the text of interest is an address of an individual, text recognition platform 225 may identify, a location (e.g., coordinates and/or position relative to other document features) in the particular type of form where an individual address is entered. Text recognition platform 225 may then identify a corresponding location (e.g., matching coordinates and/or position relative to other document features from the particular form type) in the document represented by the image data to identify the segment within the image data that is likely to include the individual address (e.g., the segment of interest).

In some implementations, text recognition platform 225 may identify multiple segments of interest within the image data. For example, in some situations, text recognition platform 225 may be attempting to recognize multiple different types of text of interest which may be included in different segments of the image data. In some situations, text recognition platform 225 may not be provided with information enabling text recognition platform 225 to identify a segment that includes text of interest (e.g., in a situation where no text of interest is provided), in which case text recognition platform 225 may identify all segments identified within the image data as segments of interest for performing text recognition.

In this way, text recognition platform 225 may identify a segment of interest, enabling text recognition platform 225 to crop the segment of interest and/or perform OCR on the segment of interest, e.g., in a manner designed to recognize text within the segment of interest.

As further shown in FIG. 4, process 400 may include cropping the segment of interest to obtain a portion of the image data (block 430). For example, text recognition platform 225 may crop the segment of interest to obtain a portion of the image data. The portion of the image data may, as discussed above, be likely to include text of interest. By cropping the segment of interest from the remainder of the image data, text recognition platform 225 may enable more efficient use of OCR techniques (e.g., by focusing OCR resources on the portion of the image data and obviating the need to run OCR on the entirety of the image data).

In some implementations, text recognition platform 225 may crop the segment of interest in a manner designed to ensure that the obtained portion of the image data does not include the edges in the image data that correspond to boxes and/or lines identified using the computer vision techniques. This may enabled, for example, OCR to be performed on the segment of interest unhindered by the boxes and/or lines, which otherwise may create inaccuracies when performing OCR.

In some implementations, text recognition platform 225 may crop multiple segments of interest to obtain multiple portions of the image data. In this situation, text recognition platform 225 may obtain multiple portions of image data in a manner designed to enable performing OCR on each portion of the image data separately. In some implementations, text recognition platform 225 may perform cropping during a different block of process 400, such as during preprocessing. In this situation, preprocessing may be used to obtain multiple segments, or multiple portions of the image data, from which text recognition platform 225 may identify one or more segments of interest. In this example situation, after identifying segments of interest from crops of the image data, text recognition platform 225 may discard the portions of the image data that do not represent segments of interest, e.g., in a manner designed to conserve resources by obviating further processing of segments of the image data that are not segments of interest.

In this way, text recognition platform 225 may crop the segment of interest to obtain a portion of the image data, enabling text recognition platform 225 to perform OCR on the portion of the image data, e.g., in a manner designed to produce recognized text.

As further shown in FIG. 4, process 400 may include performing OCR on the portion of the image data to produce recognized text (block 440). For example, text recognition platform 225 may perform OCR on the portion of the image data to produce recognized text. Text recognition platform 225 may perform OCR on the portion of the image data in a variety of ways and using a variety of OCR techniques, OCR models, and/or a combination of OCR techniques and/or OCR models. For example, text recognition platform 225 may use character recognition to target text one character at a time, use intelligent character recognition (ICR) to identify one character at a time, intelligent word recognition (IWR) to identify one word at a time, and/or the like. In some implementations, text recognition platform 225 may perform OCR by executing OCR techniques, and in some implementations text recognition platform 225 may perform OCR using one or more other devices to perform the OCR process.

In some implementations, text recognition platform 225 may use a single OCR model for recognizing text in the portion of the image data. The OCR model may be trained to receive, as input, the portion of the image data and produce, as output recognized text, e.g., machine-encoded text designed to match the text represented in the portion of the image data. In some implementations, the OCR model may be provided with additional information to facilitate text recognition, such as information identifying the expected text (e.g., the text of interest). For example, the OCR model may be provided with data indicating that the portion of the image data includes an address on multiple lines. In this situation, the OCR model may use the data to assist with the OCR process (e.g., by expecting alphanumeric characters in a predetermined format). As another example, the OCR model may be provided with data indicating that the text of interest is a policy number that includes non-alphanumeric characters. In this situation, the OCR model may use the data to assist with the OCR process by weighing non-alphanumeric characters higher than they would otherwise be weighted when identifying characters within the portion of the image data.

In some implementations, text recognition platform 225 may use multiple OCR models to recognize text in the portion of the image data. For example, text recognition platform 225 may use multiple OCR models and combine the results of the multiple OCR models to determine the recognized text (e.g., using a consensus of OCR results). In some implementations, the OCR model used may depend on the type of document represented by the image data. For example, text recognition platform 225 may have separate OCR models for different types of documents. In this situation, one OCR model may be more accurate for one document type, while another OCR model may be more accurate for a different document type, and text recognition platform 225 may choose the OCR model to be used based on the document type. In some implementations, the OCR model used may depend upon the segment of interest. For example, text recognition platform 225 may have separate OCR models for different segments within the same document, or for segments that are shared across different documents. In this situation, one OCR model may be more accurate for one type of segment (e.g., a segment that includes a street address), while another OCR model may be more accurate for a different type of segment (e.g., a segment that includes an account identifier, policy number, non-alphanumeric characters, and/or the like), and text recognition platform 225 may choose the OCR model to be used based on the type of segment. Additionally, or alternatively, text recognition platform 225 may choose an OCR model to be used based on the text of interest (e.g., by selecting an OCR model most likely to accurately recognize the particular type of text included in the text of interest).

In some implementations, text recognition platform 225 may retrain one or more OCR models used to recognize text. For example, the image data and the results of the text recognition process may be used as training data to retrain the OCR model used to obtain the results. In some implementations, training data may be verified (e.g., using a validation process such as the one described below, and/or by user review and approval). By retraining the OCR model or models used to recognize text, text recognition platform 225 may keep the OCR models up to date for their intended purpose, e.g., in a manner designed to improve the results of the OCR process.

In this way, text recognition platform 225 may perform OCR on the portion of the image data to produce recognized text, enabling text recognition platform 225 to perform a variety of actions based on the recognized text.

As further shown in FIG. 4, process 400 may include performing an action based on the recognized text (block 450). For example, text recognition platform 225 may perform an action based on the recognized text. In some implementations, text recognition platform 225 may perform a variety of actions, including, for example, validating the recognized text, storing the recognized text, providing a notification regarding the recognized text, updating a database using the recognized text, and/or the like.

For example, in some implementations, text recognition platform 225 may obtain validation data based on the recognized text. The validation data may include, for example, verification text designed to be matched with the recognized text to confirm the accuracy of the recognized text. By way of example, recognized text may include a street address, and text recognition platform 225 may obtain validation data from an address database, application, or web page, e.g., in a manner designed to confirm that the recognized street address is a valid and accurate street address. As another example, validation data may include a regular expression for a particular type of text, such as an account identifier, and text recognition platform may compare the recognized account identifier to the regular expression to determine whether the account identifier is a valid account identifier. As another example of validation data that can be used based on the recognized text, text recognition platform 225 may use a recognized account identifier to obtain information regarding a corresponding account from a database, and the information regarding the corresponding account may be compared to other information (e.g., provided to text recognition platform 225 and/or recognized in the image data) to determine whether the account identifier is accurate.

In some implementations, text recognition platform 225 may store the recognized text, e.g., in a database or other data structure. For example, text recognition platform 225 may be used by an organization to update records based on received documents, such as address change forms. In this example situation, text recognition platform 225 may receive address change forms, perform processes described above to obtain recognized text that includes an updated address, and use the updated address to update a database of addresses.

In some implementations, text recognition platform 225 may provide a notification based on the recognized text. For example, text recognition platform 225 may provide a notification to source device 210, a third party device, and or for display on a display associated with text recognition platform. The notification may include, for example, the recognized text and/or information about action taken on the recognized text (e.g., information indicating that a database was updated using the recognized text).

While a variety of example actions are described above, text recognition platform 225 may be capable of performing a variety of actions designed to facilitate recognizing text in image data and/or applications of the recognized text. In this way, text recognition platform 225 may perform an action based on the recognized text, enabling text recognition platform 225 to provide utility for accurate text recognition from image data.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   one or more memory devices; and
   one or more processors, communicatively connected to the one or more memory devices, to:
      identify a plurality of edges within a document depicted in image data,
         wherein the one or more processors, to identify the plurality of edges, are configured to:
            determine artificial edges within the document, and
            determine the plurality of edges based on the artificial edges;
      identify, based on the plurality of edges, a segment of interest within the image data;
      crop the segment of interest to obtain a portion of the image data and exclude edges, of the plurality of edges, that correspond to boxes or lines identified using one or more computer vision techniques to enable optical character recognition to be performed on the segment of interest unhindered by the boxes or the lines;
      perform the optical character recognition on the portion of the image data via one or more optical character recognition models to generate a result based on the optical character recognition;
      compare the result of the optical character recognition and validation data to verify the result of the optical character recognition based on using the result of the optical character recognition to identify the validation data; and
      retrain, based on the image data and comparing the result of the optical character recognition and the validation data, the one or more optical character recognition models to recognize text included in another segment of interest that is similar to the segment of interest.

2. The device of claim 1, wherein the plurality of edges correspond to one or more boxes or lines for text in a form associated with the image data.

3. The device of claim 1, wherein the segment of interest is defined by a rectangular shape formed by the plurality of edges.

4. The device of claim 1, wherein the image data depicts one or more of:
   an image of a form,
   an image of a word processing document,
   a portable document format (PDF) image, or
   a screen capture of a web page.

5. The device of claim 1, wherein the one or more processors are further to:
   discard portions of the image data that do not represent the segment of interest.

6. The device of claim 1, wherein the one or more processors are further to:
   obtain information identifying expected text within the segment of interest; and
   provide the information identifying the expected text to the one or more optical character recognition models.

7. The device of claim 1, wherein the one or more processors, when performing the optical character recognition, are to:
   combine a plurality of respective results of the one or more optical character recognition models to determine the result of the optical character recognition.

8. A non-transitory computer-readable medium storing a set of instructions, the set of instructions comprising:
   one or more instructions that, when executed by one or more processors of a device, cause the device to:
      identify a plurality of edges within a document depicted in image data,
         wherein the one or more instructions, that cause the one or more processors to identify the plurality of edges, cause the one or more processors to:
            determine artificial edges within the document, and
            determine the plurality of edges based on the artificial edges;
      identify, based on the plurality of edges, a segment of interest within the image data;
      crop the segment of interest to obtain a portion of the image data and exclude edges, of the plurality of edges, that correspond to boxes or lines identified using one or more computer vision techniques to enable optical character recognition to be performed on the segment of interest unhindered by the boxes or the lines;
      perform the optical character recognition on the portion of the image data via one or more optical character recognition models to generate a result based on the optical character recognition;
      compare the result of the optical character recognition and validation data to verify the result of the optical character recognition based on using the result of the optical character recognition to identify the validation data; and retrain, based on the image data and comparing the result of the optical character recognition and the validation data, the one or more optical character recognition models to recognize text included in another segment of interest that is similar to the segment of interest.

9. The non-transitory computer-readable medium of claim 8, wherein the plurality of edges correspond to one or more boxes or lines for text in a form associated with the image data.

10. The non-transitory computer-readable medium of claim 8, wherein the segment of interest is defined by a rectangular shape formed by the plurality of edges.

11. The non-transitory computer-readable medium of claim 8, wherein the image data depicts one or more of:
an image of a form,
an image of a word processing document,
a portable document format (PDF) image, or
a screen capture of a web page.

12. The non-transitory computer-readable medium of claim 8, wherein the one or more instructions further cause the device to:
discard portions of the image data that do not represent the segment of interest.

13. The non-transitory computer-readable medium of claim 8, wherein the one or more instructions further cause the device to:
obtain information identifying expected text within the segment of interest; and
provide the information identifying the expected text to the one or more optical character recognition models.

14. The non-transitory computer-readable medium of claim 8, wherein the one or more instructions, that cause the device to perform the optical character recognition, cause the device to:
combine a plurality of respective results of the one or more optical character recognition models to determine the result of the optical character recognition.

15. A method, comprising:
identifying, by a device, a plurality of edges within a document depicted in image data,
wherein identifying the plurality of edges comprises:
determining artificial edges within the document, and
determining the plurality of edges based on the artificial edges;
identifying, by the device and based on the plurality of edges, a segment of interest within the image data;
cropping, by the device, the segment of interest to obtain a portion of the image data and exclude edges, of the plurality of edges, that correspond to boxes or lines identified using one or more computer vision techniques to enable optical character recognition to be performed on the segment of interest unhindered by the boxes or the lines;
performing, by the device, the optical character recognition on the portion of the image data via one or more optical character recognition models to generate a result based on the optical character recognition;
comparing, by the device, the result of the optical character recognition and validation data to verify the result of the optical character recognition based on using the result of the optical character recognition to identify the validation data; and
retraining, by the device and based on the image data and comparing the result of the optical character recognition and the validation data, the one or more optical character recognition models to recognize text included in another segment of interest that is similar to the segment of interest.

16. The method of claim 15, wherein the plurality of edges correspond to one or more boxes or lines for text in a form associated with the image data.

17. The method of claim 15, wherein the segment of interest is defined by a rectangular shape formed by the plurality of edges.

18. The method of claim 15, wherein the image data depicts one or more of:
an image of a form,
an image of a word processing document,
a portable document format (PDF) image, or
a screen capture of a web page.

19. The method of claim 15, further comprising:
discarding portions of the image data that do not represent the segment of interest.

20. The method of claim 15, further comprising:
obtaining information identifying expected text within the segment of interest; and
providing the information identifying the expected text to the one or more optical character recognition models.

* * * * *